United States Patent
Pilorusso

[15] 3,672,073
[45] June 27, 1972

[54] TEACHING APPARATUS

[72] Inventor: Felix Pilorusso, 4271 West Eleventh Avenue, Vancouver, British Columbia, Canada

[22] Filed: Sept. 11, 1970

[21] Appl. No.: 71,502

[52] U.S. Cl. ............................................................. 35/34
[51] Int. Cl. ........................................................... G09b 23/04
[58] Field of Search ..................... 35/34, 30, 63, 18 A, 8 R; 248/DIG. 3

[56] References Cited

UNITED STATES PATENTS

| | | | |
|---|---|---|---|
| 1,912,380 | 6/1933 | McCully | 35/34 |
| 2,100,421 | 11/1937 | Wupper | 35/8 R |
| 2,312,175 | 2/1943 | Korotzer | 35/34 |
| 3,028,686 | 4/1962 | Frisch | 35/34 |
| 3,083,475 | 4/1963 | Lepoudre | 35/34 X |
| 3,107,442 | 10/1963 | Levine | 35/63 |
| 3,333,349 | 8/1967 | Brumlik | 35/18 A |

*Primary Examiner*—Wm. H. Grieb
*Attorney*—Fetherstonhaugh & Co.

[57] ABSTRACT

Apparatus having a panel providing a flat surface which represents a plane and including sets of component parts which can be secured to the panel and to each other as a geometric or other figure. The parts include elongated members which represent lines and/or vectors, spheres to represent points, and various structural components to join the aforementioned parts into a comprehensive three-dimensional figure.

12 Claims, 12 Drawing Figures

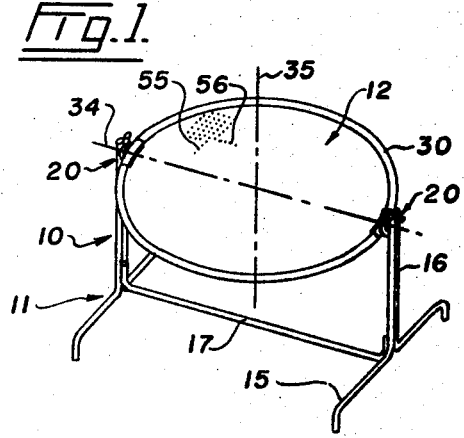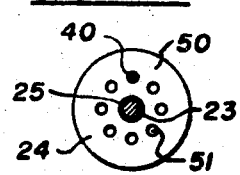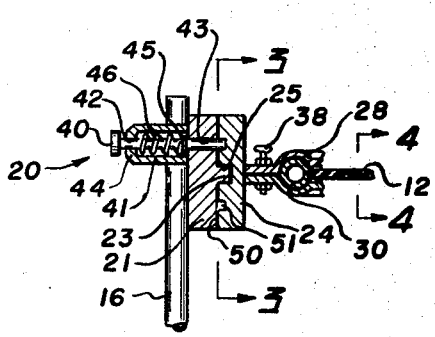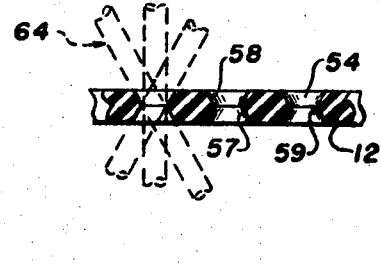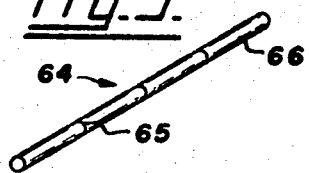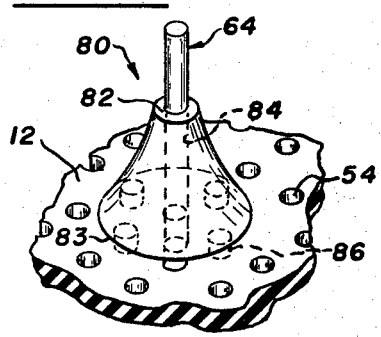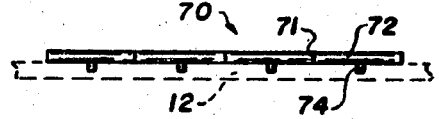
INVENTOR
FELIX PILORUSSO

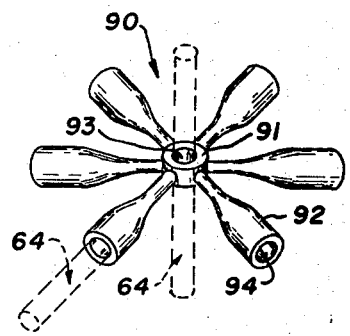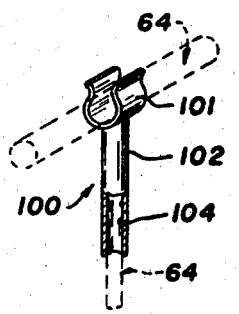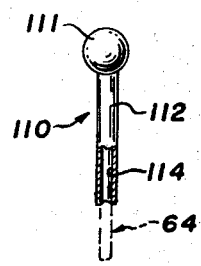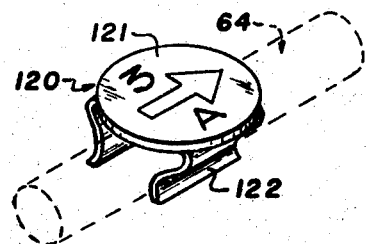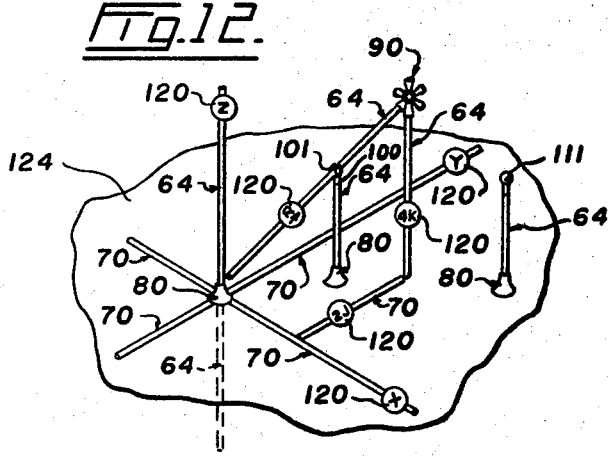

TEACHING APPARATUS

My invention relates to a visual educational device for illustrating three-dimensional problems and their solutions. More particularly, my invention is designed to teach mathematical subjects such as analytic geometry, engineering geometry, physics and the like.

The means presently available to a teacher in a classroom for representing three-dimensional figures are limited substantially to the blackboard and chalk. Even when a teacher takes great pains to draw a geometric figure for example, the students often fail to grasp what is being illustrated because of the distortion of the angles inherent in a two-dimensional drawing. When looking at a pictorial representation of a system of vectors which act in three dimensions, the students must use a great deal of imagination to visualize the physical shape of the diagram and often are lost completely when it becomes necessary to find trigonometrical relationships between the vectors. Again, distortion of the angles involved in pictorial representations makes it extremely difficult to visualize similar lines and angles which are not contained in a common plane. The analytic addition of vectors which do not act in the same plane or the graphing of a function involving three variables becomes almost meaningless to students when a teacher attempts to explain such processes on a blackboard.

I have overcome the disadvantages inherent in pictorial drawing by providing apparatus which can be used to construct a figure, diagram, or object in three dimensions and thus eliminate the problems due to distortion.

In drawings which illustrate a preferred embodiment of the invention,

FIG. 1 is a perspective view of the teaching apparatus,

FIG. 2 is an enlarged vertical section of the mounting means,

FIG. 3 is a section taken on the line 3—3 of FIG. 2,

FIG. 4 is an enlarged section taken on the line 4—4 of FIG. 2,

FIGS. 5 to 9 are perspective views showing the structural members supplied with the present apparatus FIGS. 10 and 11 are perspective views of marking devices, and FIG. 12 is a perspective view showing a typical problem in analytic geometry which can be explained by use of the teaching apparatus.

Referring to FIG. 1 of the drawings, the numeral 10 indicates generally a stand comprising a frame 11 which supports a resilient panel 12.

The frame 11 preferably is made of a lightweight tubular material and is provided with parallel legs 15 and uprights 16. A crossbar 17 extends between lower ends of the uprights 16.

In order to attach the panel 12 to the frame 11, the present apparatus is provided with mounting means generally indicated at 20. As shown best in FIGS. 2 and 3, the mounting means 20 comprises a pair of discs 21 there being one such disc welded or otherwise secured to the upper end of each upright 16. The discs 21 have inwardly projecting spindles 23 and rotatably mounted on these spindles is a second pair of discs 24 having central openings 25 to receive said spindles. Fitted to each disc 24 is a pair of inwardly projecting fingers 28 formed of resilient material. Panel 12 includes a lightweight tubular rim 30 which is circular and this rim is held between the pairs of resilient fingers 28 on opposite sides of the stand 11. Thus, the flexible panel 12 can be rotated about a horizontal axis designated by the numeral 34 in FIG. 1, this axis of course being that of the horizontally aligned spindles 23. Also, the panel 12 can be rotated about another axis 35 which is perpendicular to the horizontal axis 34.

The pairs of fingers 28 are each fitted with a clamping bolt 38, one only shown in FIG. 2. The resilient fingers 28 are shaped so that their natural tendency is to spread apart and the bolt 38 serves to draw them together into clamping engagement with the panel rim 30. By slightly backing off the bolts 38 to adjust the pressure applied to the rim 30 by the fingers 28, the panel 12 can be rotated in either direction about the axis 35. The rim 30 slides between the fingers 28 as this rotating takes place so that the panel 12 turns as a wheel about its center through which the axis 35 extends.

Referring again to FIG. 2, the mounting means 20 will be seen to include a latch pin 40 which is mounted in a housing 41 supported by the upper end of one of the uprights 16. The horizontally disposed and laterally projecting pin 40 slidably extends through openings 42 and 43 formed in end wall 44 of the housing 41 and the disc 21 respectively. A collar 45 is secured to pin 40 and a spring 46 is interposed between this collar and the end wall 44 of the housing so as to urge the latch pin 40 inwardly. Inner face 50 of the disc 24 has a number of circumferentially spaced openings 51, see particularly FIG. 3, and the inner end of the latch pin 40 is adapted to enter any one of these openings. When the latch pin 40 is withdrawn, panel 12 is free to be rotated through 360° about axis 34 and subsequently can be locked in any one of a number of tilted positions by releasing said latch pin so that it enters an opening 51.

The panel 12 is formed of a sheet of a suitable resilient material such as a thin, soft rubber, the tensioned sheet being secured to the rim 30. Panel 12 is provided with a large number of holes 54 so as to have a mesh-like appearance. The holes 54 are arranged in evenly spaced rows 55 and 56, see FIG. 1, which rows are disposed at right angles to one another. Furthermore, the holes 54 are regularly spaced apart along the two intersecting rows and extend over the entire area within the confines of the rim 30. FIG. 4 shows in detail the cross-sectional shape of the holes 54 with each hole having side walls 57 and 58 which taper inwardly to define a centrally disposed holding collar 59.

The present teaching apparatus is provided with a number of structural members which will now be described. The several members are made up in sets with an appropriate number in each set. The panel 12 is adapted to support these various members with selected members being arranged in a variety of ways to illustrate geometry and other problems in a classroom or elsewhere. One set of such structural members comprises plastic sticks 64 one of which is shown in FIG. 5. The sticks 64 may be of any desired lengths but they have a diameter slightly greater than the diameter of the collars 59 and desirably the sticks are cylindrical. At regularly spaced intervals, the sticks 64 are provided with weakening rings 65 whereby the sticks can readily be broken into pieces 66 of a desired length.

The sticks 64 mainly are intended to be mounted on the panel 12 as shown in FIG. 4. To attach a stick to the panel in this manner, the stick 64 is pushed through a hole 54 so as to be gripped and supported by the holding collar 59. Collar 59 can be distorted slightly due to its shape and the fact that the entire panel 12 is formed of a sheet of rubber-like material. In other words, the stick 64 can be moved up and down until about 180° of the tapered collar 59 extends upwardly and the remainder of the circumference of the collar extends downwardly and it is this distortion which holds said stick in a set angular position on the panel 12. This allows the stick 64 to be positioned so that it is perpendicular to the panel 12 or is disposed at an angle thereto, the maximum angle being determined by the sloping walls 57 and 58 of the hole. Assuming the portion of the stick 64 above the panel 12 is required to represent a vector, the stick is angled as required and is broken off across an appropriate ring 65 to represent a line of the required length.

In FIG. 6, another type of stick is indicated generally at 70 and this stick is also formed of plastic. Uniformly spaced weakening rings 71 are provided along the length of each stick 70 whereby the plastic stick can be broken into pieces 72 of suitable and uniform lengths. Each piece of the stick 70 defined by the rings 71 is provided with a centrally disposed anchoring peg 74. The diameter of the pegs 74 is slightly greater than the diameter of the holding collars 59 and the overall length of said pegs need not be as great as the thickness of the panel 12.

The sticks 70 are placed flat against a surface of the panel 12 and are held in position by entering the pegs 74 into holes 54. Since the pegs 74 are slightly larger in diameter than the collar 59, said collars are spread or distorted slightly thereby releasably securing the stick 70 to the panel 12. A stick 70 held in this manner is supported flat against the surface of the panel 12 and parallel thereto.

The structural member shown in FIG. 7 is a base block 80, the block being substantially in the form of a truncated cone having a top wall 82 and a bottom wall 83. The base block 80 has a through bore 84 which will receive and frictionally grip a stick 64. Bottom wall 82 is provided with a number of depending anchoring pegs 86 which are suitably spaced apart to enter adjacent holes 54 in the panel 12.

The cone-like base block 80 is adapted to be attached to the panel 12 by entering the anchoring pegs 86 into some of the holes 54, which pegs are appropriately spaced for this purpose. The base 83 is then held flat against the top surface of the panel 12 and the axis of the bore 84 is perpendicular to said panel surface. Thus, a stick 64 entered into the bore 84 is supported by the base block 80 at right angles to the panel 12 and can be used to represent a coordinate. If desired, another stick 64 can be inserted into the bore 84 from the opposite side of the panel 12 so as to represent a continuation of the same coordinate.

FIG. 8 shows another structural member which comprises a connector 90 formed of rubber or other resilient material and having an annular hub 91 and radially extending spokes 92. Hub 91 has a through bore 93. Each spoke 92 has a tubular outer end which forms a socket 94.

The resilient connector 90 can be used to secure several of the sticks 64 together so as to represent various coordinates, vectors and the like. For example, the tubular hub 91 can be threaded on to a stick 64 supported by a base block 80 and other such sticks can be entered into the sockets 94 of appropriately spaced spokes 92. The spokes 92 are readily bent to any required angle so that the sticks 64 can be supported in a variety of planes relative to the top plane of the panel 12 if suitably supported in a manner which will now be described.

The numeral 100 in FIG. 9 indicates a support which comprises a U-shaped spring clip 101 mounted on the end of a short length of tube 102. The diameter of bore 104 of the tube is such as to closely fit an end of a stick 64.

In use, a stick 64 is attached either directly to the panel 12 or is supported thereon by a base block 80 and the support 100 is secured to the top of the stick. Another stick 64 can then be embraced by the spring clip 101 so as to be spaced a suitable distance from the panel and if necessary inclined at an angle thereto.

The marking device shown in FIG. 10 is a pin 110 comprising a sphere 111 mounted on a short length of tube 112. Tube 112 has a bore 114 which will closely fit the sticks 64.

The parking pin 110 is adapted to be supported above the panel 12 by a stick 64 secured either directly to the panel or held upright by a base block 80. The sphere 111 would then represent a point defined by the geometric or other diagram erected on the panel 12 using suitable members of the aforementioned sets. For example, the sphere 111 might be representative of a point in space described by the coordinates defined by some of the sticks 64.

FIG. 11 illustrates a marking device comprising a clip indicated by the numeral 120. The marking clip 120 is a disc 121 mounted on an inverted U-shaped spring 122. On the disc 121 there is provided suitable indicia, for example, a letter-number combination with an arrow to indicate direction. The combinations on the discs 121 vary so that the several sticks 64 and 70 which are assembled on the panel 12 as a diagram can be appropriately marked.

It was previously mentioned that the teaching apparatus was designed for use in teaching such subjects as analytic geometry, engineering, plane geometry and physics and the user will find the present apparatus possesses components which can be assembled in a great variety of ways to demonstrate base concepts of a great number of subjects. An extremely simple example of use of the teaching apparatus is shown in somewhat prospective view in FIG. 12. In this figure, the numeral 124 indicates a plane which corresponds to the top surface of the panel 12. The panel 12 in this instance is horizontal but, of course, it can be tilted to any angle to suit the particular needs of the problem at hand. One of the base blocks 80 supports two vertically aligned sticks 64 above and below the panel 124 and the uppermost of these sticks is marked with a clip 120 as the Z coordinate. Four sticks 70 are assembled on the plane 124 and two of these are appropriately marked with clips 120 as the X and Y coordinates. A length of a stick 70 is used to provide a vector 2J, the vector being so marked by another clip 120. Another vector 4K is formed by a length of a stick 64 and is appropriately marked by still another clip 120. The vector 4K is connected to a vector R by a connector 90, the latter vector being a piece of a stick 64 marked as stated by a marking clip 120. The vectors 4K and R are then held at the desired angles by a support 100 which is mounted on a length of stick 64 supported by a base block 80. A point in space is then represented by the sphere 111 of a pin 110 which is mounted on a stick 64 supported by a base block 80.

From this example of the use of the present teaching apparatus, it will be apparent a wide variety of figures can be constructed which will serve as illustrations of a number of scientific concepts. The parts are simple and easily handled and are readily assembled not only so that the figure appears above the panel 12 as is usually the case but also so that the diagram will appear on both sides of the panel if this is necessary to properly illustrate a mathematical or other problem and the answer to that problem. The panel 12 can be tilted and/or rotated as required as an instructor might prefer to do as he explained different as aspects of the assembled figure to a group of students.

I claim:

1. Teaching apparatus comprising a stand, a flexible panel supported by the stand and having regularly spaced holes extending therethrough, said holes having deformable side walls, a plurality of structural members adapted to be mounted on the panel with some of said structural members representing lines of a diagram, the structural members including a first set of sticks each insertable through a hole to be supported by the side wall thereof at a selected angle to the panel, and other of the structural members being a second set of sticks each attachable to the panel to extend parallel thereto, said second set of sticks having regularly spaced anchoring pegs enterable into some of the holes to be releasably gripped by the side walls thereof.

2. Teaching apparatus as claimed in claim 1, in which each stick of the first and second set of sticks is breakable into pieces of predetermined lengths whereby the lines of the diagram represent vectors.

3. Teaching apparatus as claimed in claim 1, in which said structural members include a set of base blocks each having a through bore and depending anchoring pegs.

4. Teaching apparatus as claimed in claim 1, in which said structural members include a set of flexible connectors each having an annular hub and radial sockets.

5. Teaching apparatus as claimed in claim 1, in which the deformable side walls of each hole taper inwardly from opposite surfaces of the panel to define a collar.

6. Teaching apparatus as claimed in claim 1, and including mounting means for securing the panel to the stand for rotation about a horizontal axis.

7. Teaching apparatus as claimed in claim 6, in which said mounting means includes a latch pin for locking the panel rotated about the horizontal axis to a selected angular position.

8. Teaching apparatus as claimed in claim 7, in which said panel has a circular rim slidably supported by the mounting means.

9. Teaching apparatus comprising a stand, a flexible panel supported by the stand and having regularly spaced holes extending therethrough, said holes having deformable side walls, a plurality of structural members adapted to be mounted on the panel with some of said structural members representing lines of a diagram, the structural members including a first set of sticks each insertable through a hole to be supported by the side wall thereof at a selected angle to the panel, and other of the structural members being a second set of sticks each attachable to the panel to extend parallel thereto, said second set of sticks having regularly spaced anchoring pegs enterable into some of the holes to be releasably gripped by the side walls thereof, each stick of the first and second set of sticks having regularly spaced weakening rings which allow the stick to be broken at said ring into pieces of predetermined lengths, a base block having a through bore to receive an end of a stick and depending anchoring pegs enterable into holes of the flexible panel, a flexible connector having a bore through which a stick can project and radially extending sockets in which the ends of other sticks can be lodged, and a support having a tube mountable on an end of a stick and a spring clip attachable to another stick.

10. Teaching apparatus as claimed in claim 9, and including a marking pin having a tube mountable on a stick and a sphere carried by said tube.

11. Teaching apparatus as claimed in claim 9, and including a marking clip attachable to a stick and having indicia thereon.

12. Teaching apparatus as claimed in claim 9, and including mounting means for securing the flexible panel to the stand for independent rotation about two axes disposed at right angles to one another.

* * * * *